Figure 1:
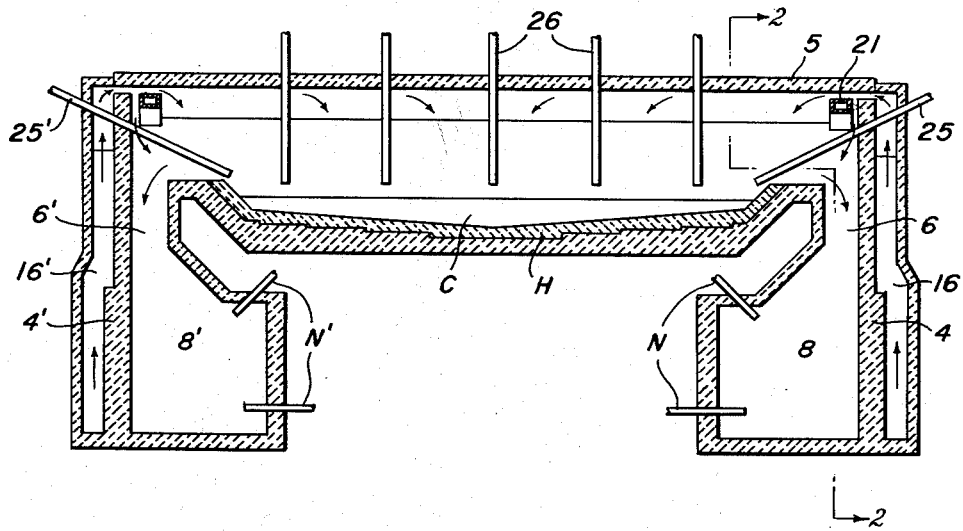

Dec. 10, 1963   F. C. McGOUGH   3,113,765
MELTING AND REFINING FURNACE AND METHOD OF OPERATION
Filed Feb. 21, 1961   2 Sheets-Sheet 1

INVENTOR.
FRANK C. McGOUGH
BY
ATTORNEY

INVENTOR.
FRANK C. McGOUGH

United States Patent Office 3,113,765
Patented Dec. 10, 1963

3,113,765
MELTING AND REFINING FURNACE AND METHOD OF OPERATION
Frank C. McGough, 4 172nd St., Hammond, Ind.
Filed Feb. 21, 1961, Ser. No. 90,880
3 Claims. (Cl. 263—15)

This invention relates to the melting and refining of metal, particularly ferrous metal, and is directed to the provision of a furnace and a method of operation representing improvements in customary open hearth furnace construction and practice utilized in the production of steel. These while greatly improved in the last few years are still subject to limitations among others of which may be mentioned relatively rapid deterioration of basic refractories used in their construction, diminution of operating efficiency from progressive accumulation of solid particles in the checker work in the regenerative chambers, difficulty of effecting precise control of various operating factors either manually or automatically and the tendency to discharge from the stack undue amounts of impurities into the atmosphere particularly when, as is becoming increasingly common practice, large amounts of oxygen are employed for decarburization during the finishing stages of a heat preparatory to pouring the melted metal.

It is therefore an object of my invention to provide a furnace and method of operation not open in material degree to the disadvantages just mentioned and so, more particularly, effective to prolong the operative life of basic refractories comprised in the furnace structure by maintaining in their proximity an oxidizing, as distinguished from a reducing, atmosphere which latter is extremely inimical to such refractories.

Another object is the provision of a furnace and auxiliary mechanisms operative at all times during the melting and refining of a charge to supply quantities of high velocity air to the chamber above the hearth and direct a portion thereof against the upper parts of the furnace end walls proximate the downtakes not only to maintain an oxidizing atmosphere adjacent the inner faces of the roof and walls but, when desired, to supply material amounts of atmospheric oxygen for combination within the furnace with the gases emitted from the charge, principally CO, and/or to supplement in appropriate degree the pure oxygen introduced into the furnace, with resultant saving in the operational cost normally incident to providing a comparable amount of pure oxygen during decarburizing or other refining operations and usually to a lesser extent during the melting stage.

A further object is to minimize discharge from the stack during furnace operation of solids entrained in the discharged gases to which increasing objection is being made by communities located in the vicinity of open hearth and other furnaces of generally similar type particularly since, as above noted, such discharges tend to augment as a result of decarburizing operations according to modern practice in the industry.

A still further object is the elimination of all regenerator checker work and thus not only its initial cost but the gradual deterioration in operating efficiency incident to collection of dust between the bricks and the expense of ultimate reconstruction after the checkers are no longer economically efficient, as well as the provision of a furnace and method of its operation which lend themselves to precise and non-varying control by suitable, preferably automatically actuated, mechanisms which when once properly adjusted can thereafter maintain a constant optimum operating efficiency.

Other objects, improvements and advantages incident to or arising from the invention are hereinafter more fully pointed out or will be apparent from the following description of a furnace constructed in accordance with it and somewhat schematically shown in the accompanying drawings and of the method of furnace operation comprehended by the invention.

Figure 2:
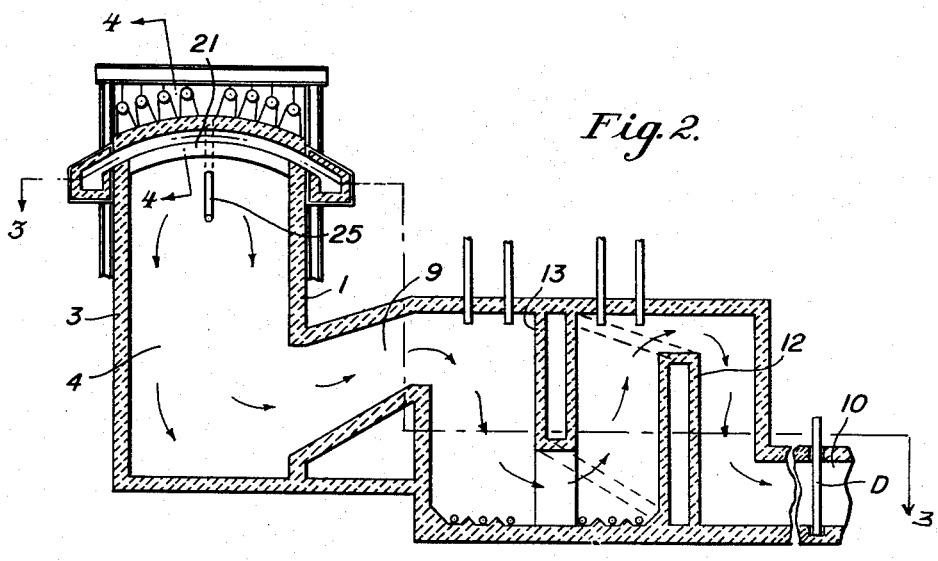
Figures 3, 4:
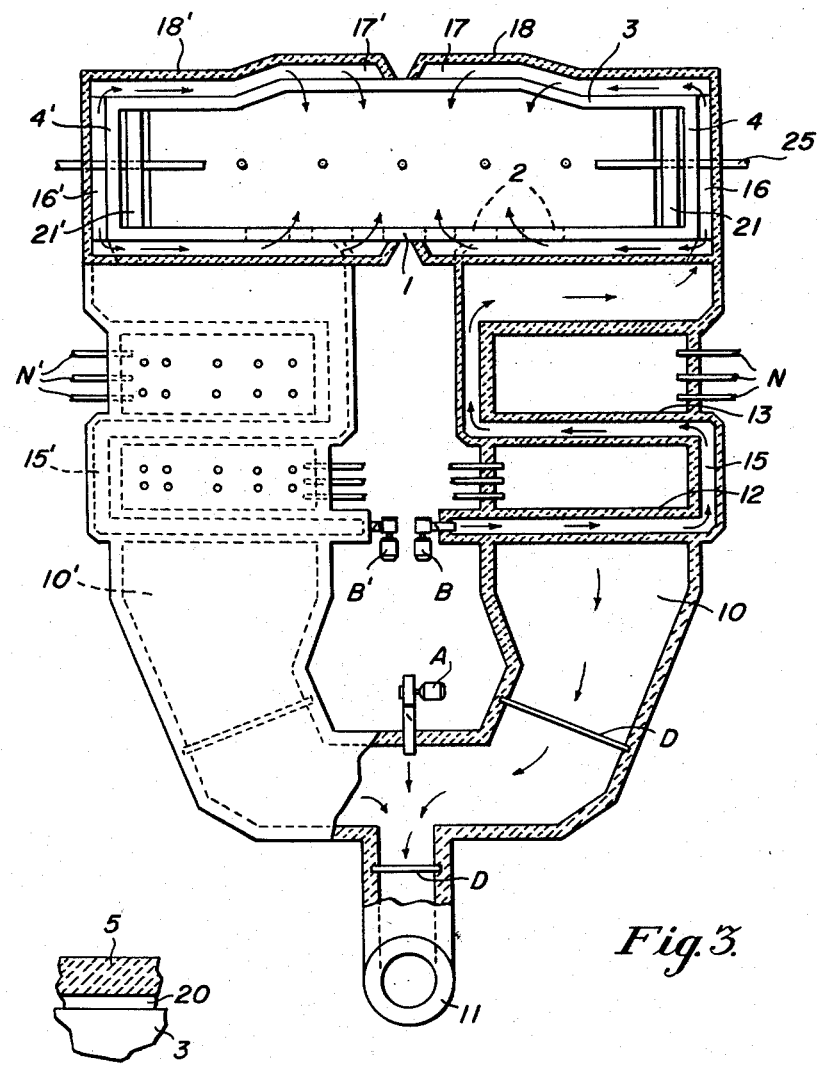

In the said drawings, FIG. 1 is a vertical central longitudinal section through the furnace;

FIG. 2 is a transverse staggered section of it on line 2—2 in FIG. 1;

FIG. 3 on a smaller scale is a horizontal section on line 3—3 in FIG. 2 with certain parts shown in plan, and FIG. 4 is a fragmentary detail section on line 4—4 in FIG. 2 but on a larger scale, all the several sections being taken in the directions indicated by the arrows on the section lines.

Since when viewed from its front or charging side the furnace and associated mechanisms are substantially similar on each side of a transverse plane midway of its ends the following description directed more especially to those lying to the right of said plane applies equally to corresponding ones on the left thereof which are designated by the same characters with the addition of a prime (′).

More specifically, the illustrated furnace which in many respects conforms to normal open hearth furnace practice, comprises a hearth H indicated as containing a charge C in process, a front wall 1 provided with charging ports 2, a rear wall 3 and end walls 4, 4′, the walls thus forming a generally rectangular structure surrounding the hearth while above the latter and walls extends a transversely arched roof 5 the interior of which is desirably faced with a basic refractory, the inner facing of the several walls being also preferably constructed likewise of basic material.

If, as shown, the roof is of suspended type, as is becoming increasingly usual in furnaces of this general character, it is spaced somewhat above the angularly inwardly and upwardly directed upper extremities of the walls for a purpose hereinafter explained whereas if it is of the wall-supported type a series of longitudinally spaced preferably similarly directed ports are formed in the upper parts of the front and back walls to afford for a like purpose passages through instead of over them.

Beyond each end of the hearth and between it and the proximate end wall 4 or 4′ as the case may be are downtake passages 6, 6′ respectively defined between the proximate end wall and the side walls and each of which communicates with a subjacent slag chamber 8 from which a conduit generally designated 9 extends to a duct 10 which communicates with the stack 11, it being of course understood that the slag chambers, conduits, and duct just described are normally located below the level of the furnace charging floor disposed somewhat below the charging ports in the customary way and further that the products of combustion generated in the vicinity of the hearth pass oppositely outward from the ends thereof, through the downtakes, slag chambers and conduits, and ultimately to the stack. As the total volume of gases discharged when the furnace is in operation is substantially divided between the downtakes their velocity therein is approximately one-half that of a similar volume discharge from but one end of a hearth as in regenerative furnace practice; consequently when so divided more of the entrained solids tend to drop to the bottoms of the slag chambers and in accordance with preferred practice of my invention heat exchange means are provided such as transverse baffles 12, 13 so disposed in each conduit that the discharged gases after traversing the slag chambers must pass thereover on their way to the stack thus progressively decreasing their temperature, volume and velocity and increasing deposit of solids in the conduits so that when the gases ultimately issue from the stack their solid content is reduced to an unobjectionable minimum. At appropriate points in the walls defining the path traversed by the outgoing gases are disposed nozzles generally designated N to spray water at high pressure into them which not only assists in lowering their temperature but adds moisture to the entrained particles with resultant increase in their weight and tendency to fall to the floor as the gases pass to the stack; the flow of these gases may be regulated by one or more dampers D interposed in each conduit while nozzles N are of course provided with suitable, preferably individual, controls (not shown). For diluting the gases a blower A may be arranged adjacent the furnace to direct atmospheric air into them preferably at the junction of the two moving streams of gases shortly before reaching the stack.

Desirably, baffles 12, 13 are hollow and interconnected to form a passage 15 for incoming atmospheric air directed into the end of one of them, which may be suitably extended beyond the conduit wall, by an appropriate blower B of a character capable of supplying a large volume of air at high velocity. This air, it will be noted, because of the interconnection of the hollow baffles lying in the path of the hot discharge gases receives some of the heat thereof during its movement over the baffles and before reaching a duct 16 extending upward along the outer face of the adjacent furnace end wall and thence connecting with elongated channels 17 in housings 18 running longitudinally of side walls 1, 3 and communicating with an inwardly and upwardly directed port (or ports) 20 just under the furnace roof.

The major portion of the high velocity air thus passes from the channels into the space above the hearth while the rest is directed downwardly by a lintel 21, preferably hollow and water cooled, disposed transversely of the furnace proximate but slightly spaced from the adjacent end wall and a little below the roof in conformity with which the lintel is curved. It results that this part of the incoming air and also some of that admitted over the upper extremities of the side walls forms constantly renewed blankets of oxidizing character against the inner faces of the upper parts of the furnace end walls before passing into the downtakes along with the products of combustion discharged thereinto over the ends of the hearth, while the remainder of the incoming air moving inwardly over the hearth from both sides of the furnace through ports 20 just beneath its roof likewise forms an ever changing blanket, again of oxidizing character, just below the latter.

The furnace of course is provided with appropriate means for heating the charge primarily as well as during the finishing stages of each heat, such means preferably comprising burners 25 for liquid or gaseous fuel and oxygen extending through the end walls oppositely inward and downward toward the hearth in the customary way and a plurality of decarburizing lances 26 passing vertically through the roof to direct oxygen downwardly to the charge principally during the finishing stages of the melt in accord with the practice now increasingly in vogue but which results in entrainment of the outgoing gases of excessive amounts of solids as hitherto explained. These several burners and lances as well as nozzles N, dampers D, blower B and other instrumentalities requiring regulation or adjustment in the interests of maximum efficiency of furnace operation are respectively provided with suitable controls (not shown) either automatic or manually actuated as will be readily understood by those familiar with the art and illustration or description of which is therefore non-essential for adequate comprehension of my invention, brief reference to the practice of which utilizing a furnace constructed in accordance with it as hitherto described will now be made.

Normally the initial heating of the charge is effected by means of burners 25 and during this period blower B may be operated to direct into the furnace only sufficient high velocity atmospheric air to adequately blanket the roof and upper parts of the end walls with a constantly moving mass of air which, being of oxidizing character, is less inimical to their exposed surfaces when made of basic refractories than gases of reducing character; additionally, it lowers the operating temperatures of the refractories and forms an insulating shield between them and the high temperature bath. However, with a view to obtaining optimum operating conditions and reducing the amount of the pure relatively highly expensive oxygen required for theoretical combustion of the fuel delivered throuhg burners 25, the amount of incoming high velocity air may be adjusted to supply a considerable portion of the total oxygen required for such combustion and may also be manipulated and controlled in such manner as to regulate the temperature, pattern and length of the burner flames. Moreover as the treatment of the charge proceeds toward and ultimately through the refining stage it is usually advisable to increase the volume of the incoming high velocity atmospheric air in relation to the pure oxygen derived from sources, such as lances 26, other than burners 25, thereby to further enhance operating economy by decreasing the total amount of the latter required for each heat. Hence it will be understood that regulation of the amount of high velocity air introduced and of the pure oxygen utilized as well as the times that changes in their relative proporations are desirable is ultimately determined with a view to obtaining maximum efficiency and economy under the precise operating conditions present including the character and make-up of the charge, the type of product desired and many other factors as will be appreciate by those familiar with the art. It may be noted that the furnace of my invention particularly lends itself to automatic control of the various instrumentalities utilized in its operation and is of such character that once it has been adjusted to a given set of operating conditions it is not subject to the gradual loss of efficiency due to clogging of checker work which occurs in melting furnaces of the regenerative type.

It may further be noted that existing open hearth furnaces of that type readily may be converted to embody the principles of my invention for operation in accordance with the method thereof at moderate cost, while the expense of upkeep of my furnace is materially less than that of comparable open hearth regenerative furnaces by reason of prolongation of the life of the basic refractories comprised in its walls and roof and avoidance of periodic rebuilding of checker work; moreover, removal of the accumulated dust and other matter from the bottoms of the slag pockets and conduits through which the discharged gases pass is easily and inexpensively effected.

I am aware that melting furnaces arranged for simultaneous discharge of exhaust gases from both ends of the hearth and devoid of regenerators comprising checker work have been proposed, notably, as disclosed in Kinzel Patent 2,039,037, April 28, 1936, which also envisions maintenance of a relatively thick layer of "substantially quiescent gas" adjacent the under side of the furnace roof which, it is averred, tends to insulate and cool it but the air between the bath and the roof at the start of a heat shortly becomes contaminated by diffusion into it of CO and other reducing agents and so if "quiescent" as averred would soon become of reducing character and remain so throughout the heat. This practice is the very antithesis of that of my invention which comprises, among other features, the constant direction of atmospheric air at high velocity into a furnace at points just beneath the roof, not only for active constant circulation between it and the bath to provide an oxidizing atmosphere in contact with the refractories but additionally, when desired, to supplement the oxygen otherwise entering the furnace.

While I have herein shown and described with considerable particularity a furnace constructed in accordance with my invention and the method of furnace operation comprised therein, I do not thereby desire or intend to restrict or confine myself specifically thereto as changes and modifications in the furnace itself as well as in said method will readily occur to those familiar with the art and may be made if desired without departing from the spirit and scope of the invention as defined in the appended claims.

Having thus described my invention, I claim and desire to protect by Letters Patent of the United States:

1. A furnace of the class described comprising a hearth, front, back and end walls and a roof, said walls partially defining a downtake and subjacent slag pocket proximate each end of the hearth, a discharge gas conduit extending from each slag pocket and connecting with a stack, means concurrently operable to impinge from each end of the furnace upon a charge on the hearth an inwardly downwardly directed flame, conduits paralleling the front and back walls respectively adjacent the roof, means defining ports extending from said conduits inwardly to the furnace proximate the roof, and means operative to direct air at high velocity through said conduits and into the furnace.

2. A furnace of the class described comprising a hearth, front, back and end walls and a roof, said walls partially defining a downtake and subjacent slag pocket proximate each end of the hearth, a discharge gas conduit extending from each slag pocket and connecting with a stack, means concurrently operable to impinge from each end of the furnace upon a charge on the hearth an inwardly downwardly directed flame, the front and back walls respectively and the roof defining ports extending inwardly into the furnace proximate the roof, conduits disposed outwardly of and paralleling said front and back walls communicating with the interior of the furnace through said ports, means operative to direct air at high velocity through said conduits, and a lintel disposed transversely of the furnace proximate the upper extremity of each end wall, spaced inwardly therefrom and having its upper surface below the contiguous portion of the roof to thereby provide passages for portions of said air respectively over the lintel and downwardly adjacent the inner face of the proximate end wall.

3. In a method of operating a metallurgical furnace having a roof with a periphery that includes opposed end portions, the step which comprises projecting air oppositely inward into the furnace through a plurality of ports adjacent another portion of the periphery other than the opposed end portions of the furnace roof in substantial parallelism with its surface and other air oppositely inward from adjacent the ends of the roof to thereby maintain a constantly changing blanket of air proximate said surface.

References Cited in the file of this patent

UNITED STATES PATENTS

| | | |
|---|---|---|
| 968,238 | Eldred | Aug. 23, 1910 |
| 1,035,331 | Eldred | Aug. 13, 1912 |
| 1,414,451 | Arthur | May 2, 1922 |
| 1,545,823 | Feild | July 14, 1925 |
| 1,659,869 | Gow | Feb. 21, 1928 |
| 2,385,261 | Crowe | Sept. 18, 1945 |
| 2,662,761 | Chesters | Dec. 15, 1953 |